UNITED STATES PATENT OFFICE.

JOSEPH WARREN WATTLES, OF CANTON, MASSACHUSETTS.

COMPOUND FOR ADDITION TO SIZE FOR YARNS AND FABRICS.

SPECIFICATION forming part of Letters Patent No. 414,351, dated November 5, 1889.

Application filed June 26, 1886. Renewed October 2, 1888. Serial No. 287,020. (No specimens.)

*To all whom it may concern:*

Be it known, that I, JOSEPH WARREN WATTLES, of Canton, in the county of Norfolk and State of Massachusetts, have invented a certain new and useful Improvement in Compounds for Addition to Size for Yarns and Fabrics, of which the following is a specification.

In the preparation of sizing or dressing for yarns and cloths as ordinarily carried on it has been the custom to employ starch or flour, or both together, with water, which compound, after having been fermented, is diluted with water until reduced to the proper consistency for use, when it is transferred to the slasher or other sizing-machine, in which it is applied to the yarn or fabric, as desired. The sizing compound as thus prepared, while answering to some extent the general requirements of such material, has been found more or less defective, by reason of the tendency of the starch or flour to separate from the water and settle or subside, leaving the compound too thin for use, and also because of its tendency to mold and cause the yarn or fabric to which it is applied to mildew, especially if the same is not thoroughly dried before being wound upon the beam. Various materials have heretofore been added to this compound to obviate these defects, the most efficient of which are those described in Letters Patent Nos. 168,435, 172,216, and 292,269, wherein acetic acid and starch or flour, both in a moist and dry state, as well as such ingredients with the addition of oil or grease. These compounds, while answering to a satisfactory degree the purpose for which they were intended, have not imparted to the yarn or material to which the sizing compound has been applied the body and firmness that is desirable in some particular forms thereof.

I have discovered that by the union of starch or flour, acetic acid, gum-thus, grease or oil, water, paraffine-wax, silicate of soda, and spirits of turpentine, I produce a compound which, when added to the ordinary sizing compound, either at the time of manufacture or afterward, not only prevents the subsidence of the starch or flour therein and the mildew of the yarn to which it is applied, but also improves its quality and imparts to the yarn or material the requisite body and firmness.

My present invention therefore consists in a compound for addition to the ordinary sizing compound or dressing, in which the ingredients above enumerated are combined.

In preparing my improved compound, I take by weight one hundred and twenty-five (125) pounds of starch or flour, forty (40) pounds of acetic acid, twenty-five (25) pounds of gum-thus, twenty-five (25) pounds of any suitable grease or oleaginous material, fifty (50) pounds of water, twenty-five (25) pounds of paraffine-wax, ten (10) pounds of silicate of soda, and eight (8) pounds of spirits of turpentine, and after having pulverized the gum thoroughly intermix them together. To effect this intermixing of the materials in the most satisfactory manner, I have found it convenient to first combine the acid, gum, grease or oil, water, paraffine-wax, silicate of soda, and spirits of turpentine and after having thoroughly incorporated them to add the starch or flour and stir it into the mass until the mixture thus formed is of a uniform consistency. The compound is then placed in barrels or other suitable receptacles, and is ready for use.

To use my improved compound, a small percentage of it is to be added to and thoroughly incorporated with the sizing or dressing as ordinarily made, the percentage of the compound so added being dependent upon the consistency of the sizing or dressing and the particular character of the yarn or fabric to which it is to be applied, and I have found by practical experience that sizing or dressing improved by the addition of this compound not only works better while being applied to the yarn or fabric, but imparts to it a body and firmness that is not possible with the sizing or dressing compounds heretofore in use.

While I have described the proportions of the materials employed by me in the manufacture of my improved compound which I have found to give the best results, it is to be understood that I do not limit myself to them, as the same may be somewhat varied without materially affecting the character or utility of my invention. Neither do I limit myself to the use of gum-thus and spirits of turpentine, as it is obvious that spruce gum or ordinary rosin may be used in place of the former, and naphtha or other solvent and drier in lieu of the latter.

If desired, a small amount of fragrant essential oil—as oil of sassafras, for example—may be added to neutralize any disagreeable smell that may result from the compound, and act in a measure as an antiseptic.

I do not claim herein a compound for addition to and improvement of ordinary sizing or dressing, consisting of starch, acetic acid, and a resinous material mixed or combined together, as the same forms the subject of an application for Letters Patent filed by me in the United States Patent Office on or about November 3, 1888; but What I do claim, and desire to secure by Letters Patent of the United States, is—

1. The compound for addition to ordinary yarn sizing or dressing, consisting of starch, acetic acid, oleaginous matters, silicate of soda, spirits of turpentine, paraffine-wax, and a resinous material, substantially as described.

2. The compound for addition to ordinary yarn sizing or dressing, consisting of starch, acetic acid, gum-thus, grease or oil, paraffine-wax, silicate of soda, and spirits of turpentine, substantially as described.

3. The compound herein described, consisting of starch, acetic acid, gum-thus, grease or oil, paraffine-wax, silicate of soda, spirits of turpentine, water, and oil of sassafras, substantially as set forth.

JOSEPH WARREN WATTLES.

Witnesses:
N. W. DUNBAR,
WALTER AMES.